Figure 4:
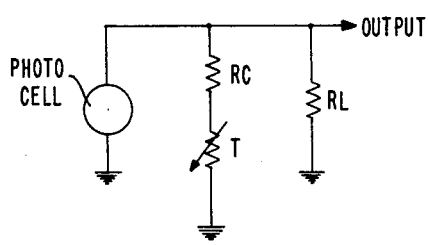

Oct. 16, 1962    G. C. ANTHONY ET AL    3,059,120
POSITION SENSING SYSTEM
Filed Feb. 2, 1961    4 Sheets-Sheet 1

$\cos \gamma_x = \cos\theta \cos\Phi$ $\cos \gamma_y = \cos(90°-\theta)\cos\Phi = \sin\theta \cos\Phi$ $\cos \gamma_z = \cos(90°+\Phi) = -\sin\Phi$ INVENTORS
GILBERT C. ANTHONY
FRANK A. BOYER
BY Ralph R. Barnard
ATTORNEY

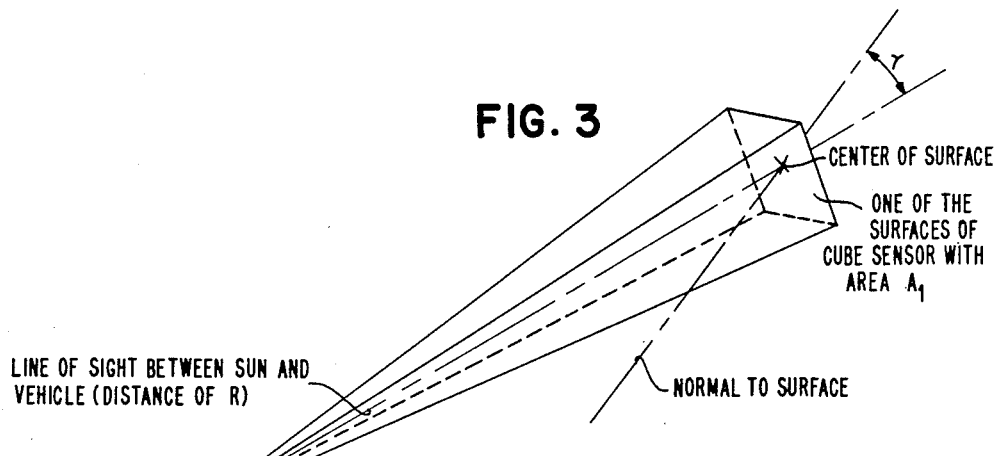
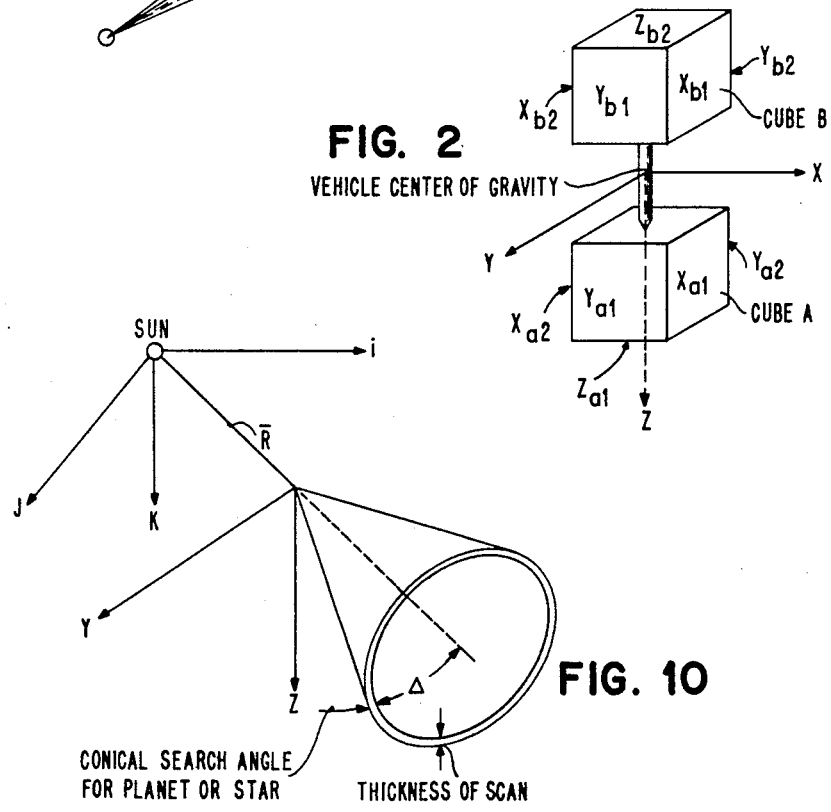

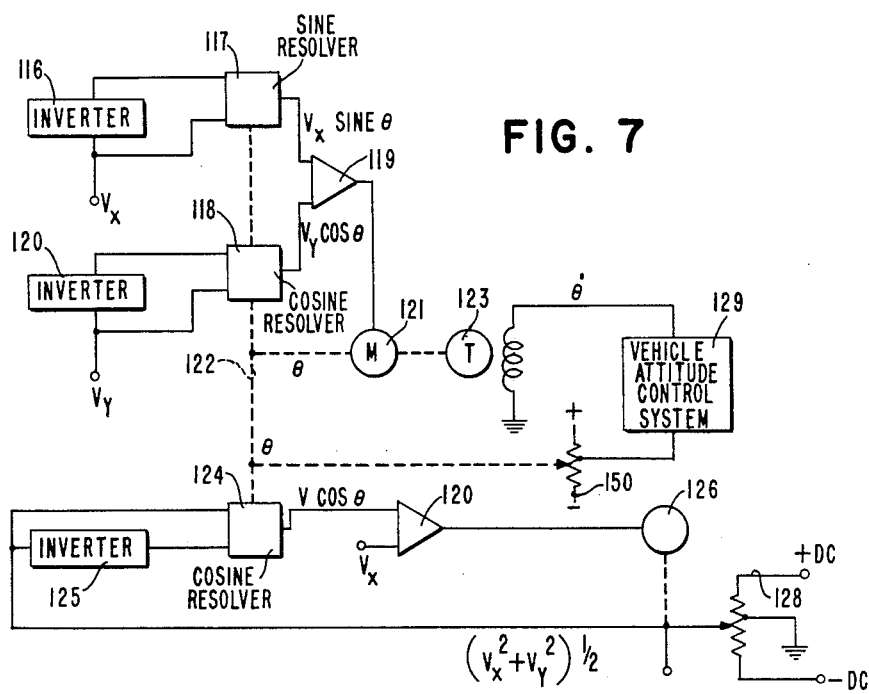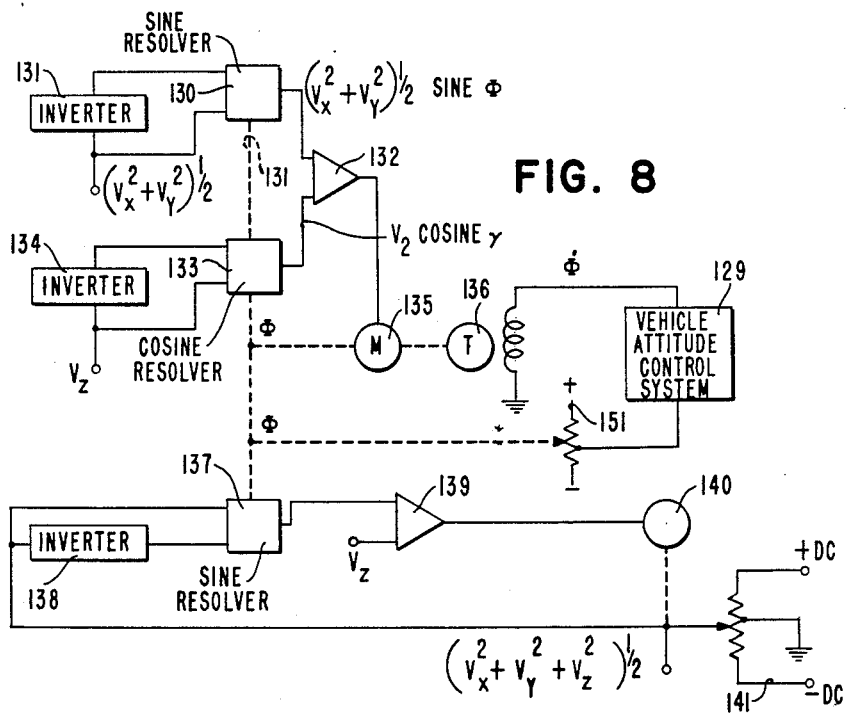

United States Patent Office 3,059,120
Patented Oct. 16, 1962

3,059,120
POSITION SENSING SYSTEM
Gilbert C. Anthony, Rockville, Md., and Frank A. Boyer, Cedar Rapids, Iowa, assignors to International Business Machines Corporation, New York, N.Y., a corporation of New York
Filed Feb. 2, 1961, Ser. No. 86,678
9 Claims. (Cl. 250—220)

The present invention relates to improvements in electromagnetic sensing systems and more particularly to a new and improved attitude and position sensing system using electromagnetic sensing.

Space travel has created new operating conditions for vehicle guidance systems. Equipment reliability and power consumption are important considerations in interplanetary space travel. Because a trip in space may have a duration of a year or more, it is desirable that navigation equipment be devised which can be turned on at intermittent intervals for the purpose of checking the position of the vehicle with respect to celestial navigational references exemplified by the sun, other stars, and other light emitting celestial bodies.

Conventional guidance systems utilize inertial platforms, horizon seekers, star trackers, etc. for continuously determining the attitude and position of a vehicle in flight. Such systems provide no useful information after periods of inoperation without first utilizing other means for establishing reference conditions. It is, therefore, desirable that means be available to establish navigational information such as the attitude and position of a vehicle with reference to such celestial bodies as the sun (for a first order of brightness) rapidly and relatively accurate.

It is, therefore, a primary object of the present invention to provide a new and improved attitude and position sensing system using electromagnetic sensing.

It is still another object of the present invention to provide a new and improved attitude and position sensing system by electromagnetically sensing the brightest celestial body within the entire celestial sphere of a vehicle.

It is another object of the present invention to provide a new and improved attitude and position sensing system which utilizes a minimum of moving parts external to the vehicle so as not to adversely effect the dynamics of the vehicle.

It is still another object of the present invention to provide a new and improved attitude and position sensing system using electromagnetic sensing which may operate in an intermittent manner so as to minimize power consumption.

It is an additional object of the present invention to provide a new and improved attitude and position sensing system using electromagnetic sensing which has inherent reliability because of its simplicity.

It is a further object of the present invention to provide a new and improved attitude and position sensing system which provides an axis reference in space with previous vehicle attitude information.

The objects of the present invention are provided by sensing the attitude and position of a light source with respect to the body axis system of the vehicle which has a sensor mounted thereon having plural photoelectric surfaces external to the vehicle for receiving light rays from the source. Since each of the plural surfaces receive a different amount of light from the source determined by the angle of incidence of the line of sight between the source and that sensor surface, each sensor surface will generate a voltage in accordance with the angle of incidence and these voltages are used in a computer for deriving electrical quantities commensurate with the range to the light source and the angle of deviation to the light source.

The foregoing and other objects, features and advantages of the invention will be apparent from the following more particular description of a preferred embodiment of the invention as illustrated in the accompanying drawings.

Figure 1:
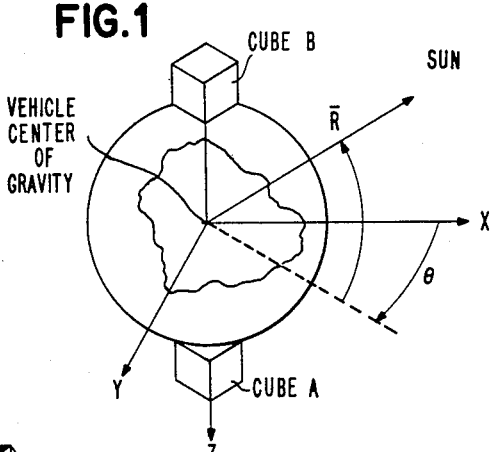
Figure 5A:
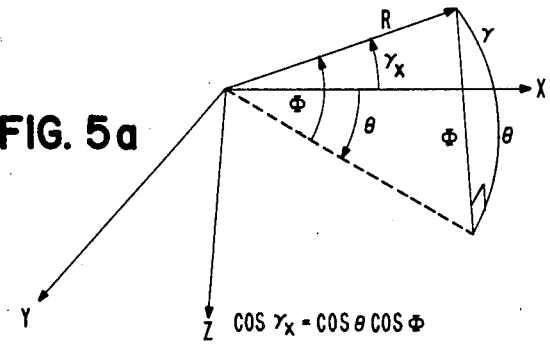
Figure 5B:
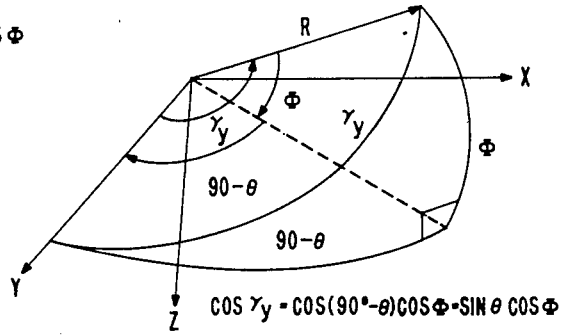
Figure 5C:
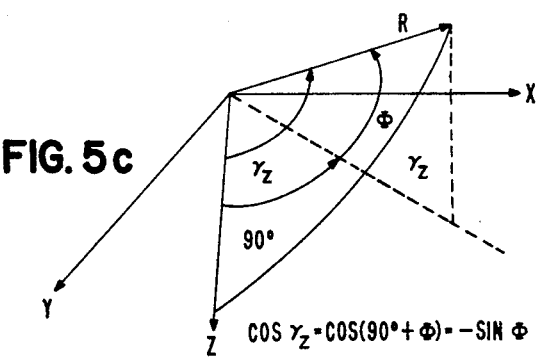
Figure 6:
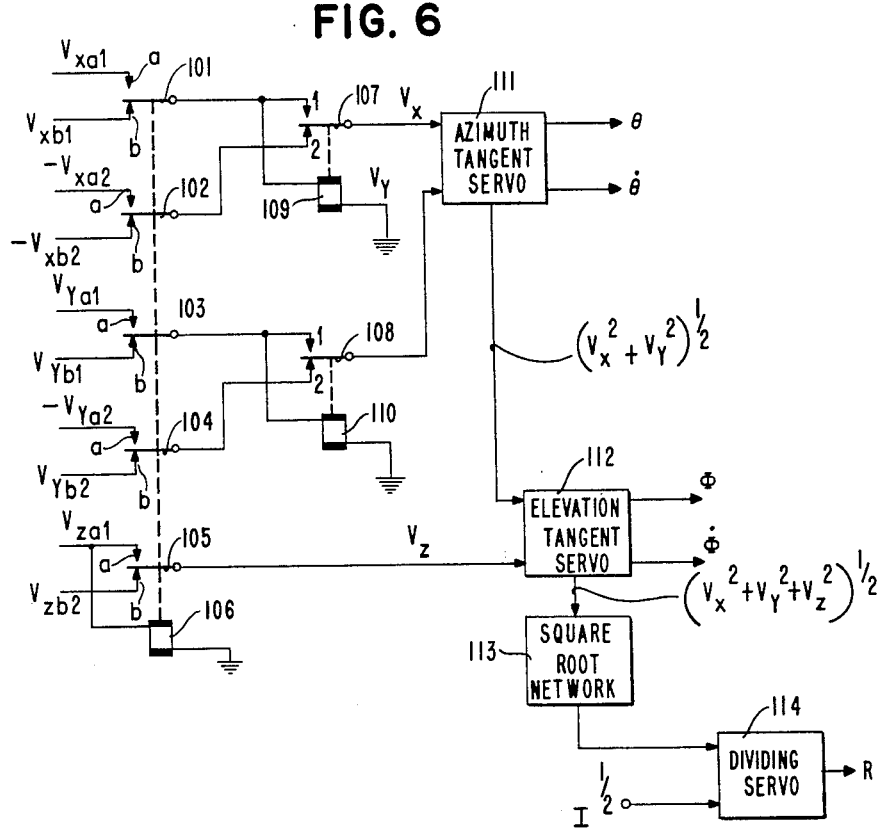
Figure 9:
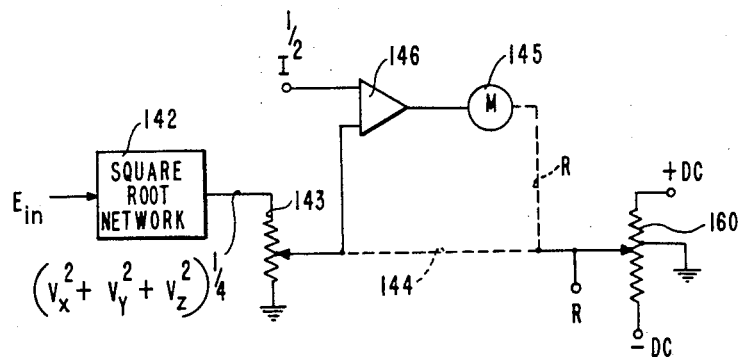

In the drawings:
FIG. 1 shows an arrangement of electromagnetic sensors on a vehicle in accordance with the teachings of the present invention;
FIG. 2 shows the sensors arranged as in FIG. 1 with sensor surfaces identified according to the body axis and the cube with which they are associated;
FIG. 3 is a diagram showing the amount of luminous flux being intercepted by a sensor surface;
FIG. 4 shows an electrical circuit for providing a voltage readout from each photosensitive surface of each cube;
FIGS. 5a, 5b, and 5c are diagrams illustrating the right spherical triangular relationships of the angle of incidence of the sun's rays upon each of the surfaces of a cube sensor;
FIG. 6 is an exemplary electrical block diagram of an analog computation for solving the three spherical coordinates of the sun's position vector with respect to the body axis of the vehicle in accordance with the teachings of the present invention;
FIG. 7 shows a conventional tangent servo which may be used in FIG. 6 for the analog computation of the spherical coordinate $\theta$;
FIG. 8 shows a conventional tangent servo which may be used in FIG. 6 for the analog computation of the spherical coordinate $\phi$;
FIG. 9 shows an electrical block diagram of a conventional dividing circuit which may be used in the analog computation shown in FIG. 6;
FIG. 10 diagrammatically illustrates that as a result of the utilization of the teachings of the present invention a conical search pattern may be initiated for locating a second celestial light source.

Referring to FIG. 1, there is diagrammatically shown a spherical space vehicle which has a cubic sensor A and B mounted on each side of the vehicle along the Z body axis. Also shown are the X and Y body axes of the vehicle. Displaced from the body axes of the vehicle is shown a vector $\bar{R}$ representing the line of sight from the vehicle to the sun and its magnitude. Moreover, the azimuth and elevation angles, $\theta$ and $\phi$, respectively, are used to identify the deviations of the line of sight from the X axis of the vehicle. The angles $\theta$ and $\phi$ together with the distance between the sun and the vehicle R may be said to be the spherical coordinates of the sun with respect to the vehicle body axes.

The teachings of the present invention relate to the use of sensors such as A and B to define the line of sight to the sun $\bar{R}$ in terms of the angles of the $\theta$ and $\phi$ and the range of the sun from the vehicle.

Referring to FIG. 2, the same cubic sensors A and B are shown arranged substantially in the same manner as FIG. 1, except that the vehicle is represented only by its body axes X, Y and Z and its center of gravity. It should be noted that there are a total of ten exposed surfaces on cubes A and B which could be illuminated by the sun depending upon the particular position of the sun in the celestial sphere of the vehicle. The fundamental principle on which the teachings of the present invention is based is that the sun will illuminate three of the surfaces of one of the two cubes in a manner which can be utilized in deriving the spherical coordinates of the sun with respect to the vehicle body axes.

Inspection of FIG. 2 will indicate that the surfaces of the cubes are oriented to be perpendicular to the body axes by which they are identified. For example, all of the sensor surfaces identified with X are normal to the X axis.

Subscript "a" or "b" identifies the particular cube on which the surface is located and subscript "1" and "2" identifies the positive and negative directions, respectively, of the surface faces with respect to the X, Y and Z axes. It should be noted that arrows have been placed on the axes so as to indicate direction according to the conventional right hand rule.

Accordingly in FIG. 2, $X_{b1}$ designates the surface of cube B which is normal to the X axis in the direction of the arrow indicating a positive polarity. Similarly, $X_{a1}$ designates the surface of cube A which is normal to the X axis in the same direction as the arrow indicating a positive polarity. Note that the surface of cube A which is normal to the X axis but which receives the sun rays in a direction reversed from the arrow designating the polarity of the X axis is identified as $X_{a2}$. The surface of cubes A and B along the Z axis which face each other are not given a designation on FIG. 2 because these are the mounting surfaces and will not be exposed to the sun for any position the vehicle may have in the celestial sphere of the vehicle. However, each of the other surfaces are identified according to the aforementioned scheme.

It is emphasized that the position of the sun in the celestial sphere of the vehicle will never be such that it illuminates both sensor surfaces $Z_{a1}$ and $Z_{b1}$. Furthermore, when it is determined that one of these surfaces is being illuminated and the photosensitive material thereon generates a voltage, the surfaces of the other cube (A or B) need not be considered in determining the spherical coordiantes of the sun with respect to the vehicle body axes.

The voltage generated in any of the surfaces of one of the cubes (A or B) is determined by the amount of luminous flux flowing out of the sun within the small solid angle subtended by that surface. Mathematically, this relationship may be represented by the following equation:

$$F = I \frac{A \cos \gamma}{R^2} = \text{lumens} \qquad (1)$$

where:

$I$ = the luminous intensity of the sun;
$A$ = the area of the sensor face;
$\gamma$ = the angle between the normal to the face of the sensor and the line between the vehicle and the sun;
$R$ = the distance from the sun to the sensor face; and
$F$ = the luminous flux in this solid angle.

FIG. 3 illustrates Equation 1 graphically. Therein the line of sight from the source to the vehicle is shown intersecting the photosensitive surface of a cube making an angle $\gamma$ with the normal to that surface.

Illumination E of the surface of the cubic sensor is equal to the illuminous flux per unit area and may be represented by Equation 2 which is:

$$E = \frac{F}{A} = \frac{I \cos \gamma}{R^2} \text{ lumens/meter}^2 \qquad (2)$$

The illumination of a particular surface ($X_{a1}$, $X_{b1}$, $Y_{a1}$, $Y_{b1}$, $Z_{a1}$, or $Z_{b1}$, etc.) coated with a conventional photosensitive material will generate a voltage. FIG. 4 shows a conventional photosensitive circuit which might be used for each exposed surface of cubes A and B. As those skilled in the art know, photosensitive devices are somewhat nonlinear in their response based on the type of photosensitive material selected, the uniformity of the thickness, the light intensity and the ambient temperature. FIG. 4 illustrates one circuit which could be used to obtain satisfactory linearity. Resistor $R_C$ provides for proper calibration and thermistor T modifies the load $R_L$ shunting resistance with temperature to eliminate ambient temperature changes problems. FIG. 4 may thus operate in a manner that illumination E of a surface bears a direct relationship with the voltage drop V over load $R_L$. Many other circuits are known to those skilled in the art for compensating for the aforementioned nonlinearities resulting from changes in environment. For example, a bridge-type circuit might be used utilizing parameters which vary with the environment.

Under these conditions, Equation 2 may be modified to:

$$V = \frac{I \cos \gamma}{R^2} \qquad (3)$$

where:

$V$ = the voltage generated by a surface as a result of being illuminated.

The general relationship between the angle of incidence and a particular surface of a photosensor and the voltage derived therein is thus established by Equation 3. However, for a particular position of the sun in the celestial sphere of the vehicle, the angle of incidence of the sun's rays on each of the exposed surfaces of the two cubic sensors A and B is different and there is a determined relationship.

Hereinabove, each of the surfaces of cubes A and B has been identified with respect to a set of vehicle body axes. Furthermore, the spherical coordinates of the light source (the line of sight to the sun) have been defined with respect to the vehicle body axis. Because the cubic sensors have plural surfaces, it is necessary to determine the angle of incidence ($\gamma$) of the sun's rays represented by the line of sight (from the light source) on each of the respective surfaces of the cubic sensors. Each of these angles is identified as $\gamma_x$, $\gamma_y$, $\gamma_z$, respectively, and are shown in FIGS. 5a, 5b and 5c as the angles between the sun position vector ($\bar{R}$) and the X, Y and Z body axes.

FIG. 5 also shows the relationship between these angles and the spherical coordinate angles $\theta$ and $\phi$ as follows:

$$\cos \gamma_x = \cos \theta \cos \phi \qquad (4)$$
$$\cos \gamma_y = \sin \theta \cos \phi \qquad (5)$$
$$\cos \gamma_z = \sin \theta \qquad (6)$$

When the sun is shining on the negative face of the cube, $\cos \gamma$ is negative. For example, when the sun is shining on face $z_{b2}$ rather than $z_{a1}$, $\cos \gamma_z$ is negative. The following expressions may be written for the voltage generated on each surface:

$$V_{xa1} = \frac{I}{R^2} \cos \theta \cos \phi \text{ for } |\theta| \leq \frac{\pi}{2} \text{ and } \phi \leq 0 \qquad (7)$$

$$V_{xb1} = \frac{I}{R^2} \cos \theta \cos \phi \text{ for } |\theta| \leq \frac{\pi}{2} \text{ and } \phi \leq 0 \qquad (8)$$

$$V_{xa2} = -\frac{I}{R^2} \cos \theta \cos \phi \text{ for } |\theta| \leq \frac{\pi}{2} \text{ and } \phi \leq 0 \qquad (9)$$

$$V_{xb2} = -\frac{I}{R^2} \cos \theta \cos \phi \text{ for } |\theta| \leq \frac{\pi}{2} \text{ and } \phi \geq 0 \qquad (10)$$

$$V_{ya1} = \frac{I}{R^2} \sin \theta \cos \phi \text{ for } \theta \leq 0 \text{ and } \phi \leq 0 \qquad (11)$$

$$V_{yb1} = \frac{I}{R^2} \sin \theta \cos \phi \text{ for } \theta \geq 0 \text{ and } \phi \geq 0 \qquad (12)$$

$$V_{ya2} = -\frac{I}{R^2} \sin \theta \cos \phi \text{ for } \theta \leq 0 \text{ and } \phi \leq 0 \qquad (13)$$

$$V_{yb2} = -\frac{I}{R^2} \sin \theta \cos \phi \text{ for } \theta \leq 0 \text{ and } \phi \geq 0 \qquad (14)$$

$$V_{za1} = -\frac{I}{R^2} \sin \phi \text{ for } \phi \leq 0 \qquad (15)$$

$$V_{zb2} = \frac{I}{R^2} \sin \phi \text{ for } \phi \geq 0 \qquad (16)$$

where:

$$|\theta| \leq \pi \text{ and } |\phi| \leq \frac{\pi}{2}$$

The limits on Equations 7 through 16 are required because the photosensitive coating on the surfaces will react to light energy which strikes on the surfaces and after these surfaces are in the shadow of the sensor, the output of that sensor surface is zero. The spherical coordinate $\phi$ must also have limits specified for these equations because one of the cube sensors will usually be in the shadow of the vehicle. These limits restrict the applicability of the aforementioned equations 7 to 16 to those equations associated with the faces of the cube on the exposed side of the vehicle. Thus, if spherical coordinate $\phi$ is positive, the equations associated with cube B must be used. The spherical coordinate $\phi$ is negative, the equations associated with cube A must be used.

As already described hereinabove, there are only five equations associated with a particular cube.

Furthermore, since a point source of light, such as the sun, will simultaneously illuminate only three surfaces of the selected cube, only three of the five equations associated with a particular cube need be considered to determine three spherical coordinates. The particular combination of these surfaces and their corresponding equations are selected as follows:

(1) Because only one of the "z" surfaces of the sensor is illuminated at any given time, the cubic sensor which has its "z" surface illuminated will be used. It is only the equations associated with that cube which are meaningful. For example, if $V_{zb2}$ is greater than 0, this indicates that $\phi$ is greater than 0 and positive, then cube B is to be used. Under these conditions, five of the ten sensor equations relating to cube A need not be considered.

(2) Since the positive and negative surfaces on a given axis of the selected cube can also never be illuminated at the same time, two more equations are eliminated, leaving only the appropriate three equations.

Thus, if $E_{xb1\gamma0}$ and $E_{yb1\gamma0}$, Equations 8 and 12 should be used.

By changing all the minus signs in Equations 7 through 16 from the right to the left side of the equations, only three terms will ever remain on the right side of these equations. The three remaining equations may be generally expressed as follows:

$$V_x = \frac{I}{R^2} \cos \theta \cos \phi \quad (17)$$

$$V_y = \frac{I}{R^2} \sin \theta \cos \phi \quad (18)$$

$$V_z = \frac{I}{R^2} \sin \phi \quad (19)$$

the three spherical coordinates of the sun position vector can be solved in terms of these new variables. By squaring and summing Equations 17, 18 and 19, the following solution for R is obtained.

$$\phi = \arctan V_z(V_x^2 + V_y^2)^{-\frac{1}{2}} \quad (20)$$

Dividing Equation 18 by Equation 17 provides the solution for $\phi$, $$\phi = \arctan \frac{V_y}{V_x} \quad (21)$$

Similarly, dividing Equation 19 by the square root of the sum of the squares of Equations 17 and 18, the solution for $\phi$ is:

$$\phi = \arctan V_z(V_x^2 + V_y^2)^{-\frac{1}{2}} \quad (22)$$

Accordingly, while the sensor is constructed with plural surfaces for generating ten voltage outputs and these voltage outputs may be analyzed in accordance with ten equations, any given position of the sun in the celestial sphere of the vehicle will require the monitoring of three photosensitive surfaces which are generating voltages in accordance with three of the equations. By way of example, a specific location of the sun in the celestial sphere of vehicle will generate voltages in accordance with Equations 17, 18, and 19 corresponding to an X surface, a Y surface and a Z surface, respectively. These three surfaces will be those on only one of the cubes. Furthermore, the voltages generated in accordance with the three remaining equations in the three photosensitive circuits (exemplified by FIG. 4) may be used to solve for the three spherical coordinates of the sun position vector $(\overline{R})$ with respect to the body axes of the vehicle in accordance with Equations 20, 21, and 22.

Computer means may be constructed of either the digital or analog type to properly select the three voltage inputs and solve the Equations 20, 21, and 22. Referring now to FIG. 6, there is shown an analog computer instrumentation of the teachings of the present invention. Along the left edge of the figure are plural terminals connected to receive voltage inputs from the ten photosensitive circuits representing the voltages of Equations 7 through 16. As shown, the voltage inputs from the corresponding surface of each of the two cubes are arranged in pairs. For example, $V_{xa1}$ is paired with $V_{xb1}$, $V_{xa2}$ is paired with $V_{xb2}$, $V_{ya1}$ is paired with $V_{yb1}$, $V_{ya2}$ is paired with $V_{yb2}$ and $V_{za1}$ is paired with $V_{zb2}$. Each of these paired voltage input terminals are connected to one of plural single-pole double-throw switches, 101, 102, 103, 104 and 105, with the voltage from the cube A energizing "a" contact and the voltage from the cube B energizing "b" contact for each switch. Switches 101, 102, 103, 104 and 105 are mechanically ganged to be operated in accordance with the state of energization of relay coil 106.

According to the operation of the sensor as set forth hereinabove, either cube A or B is selected for a given position of the sun with respect to the vehicle. This selection is determined by whether a voltage $V_{za1}$ or $V_{zb2}$ is being generated. As shown, the $V_{za1}$ terminal is connected to relay coil 106 so that when $V_{za1}$ is energized, the photocell sensor circuits associated with cube A are being monitored by the plural single-pole double-throw switches. Conversely, when a voltage $V_{zb2}$ is present, no voltage $V_{za1}$ is present and the relay switches are biased so that the photosensitive circuits associated with cube B are connected to the output of the relay switches associated therewith. The outputs of switches 101 and 102 are connected to the 1 and 2 contacts, respectively, of another single-pole double-throw switch 107. Similarly, the outputs of switches 103 and 104 are connected to the 1 and 2 contacts, respectively, of another single-pole double-throw switch 108. The armature of relay 109 is mechanically connected to the single-pole double-switch 107. The armature of relay 110 is mechanically connected to the single-pole double-throw switch 108.

The purpose of switches 107 and 108 is to select between the voltages generated in the photosensitive circuits associated with the positive and negative surfaces of the selected cube normal to the X and Y body axes, respectively, of the vehicle. In order that the switches 107 and 108 operate in this manner, the coil of relay 109 is connected for energization by the voltages associated with the positive surface normal to the X axis and the coil of relay 110 is connected for energization by the voltages associated with the positive surface normal to the Y axis. Since each of the switches is normally mechanically biased so that its output is connected to a voltage associated with a negative surface, the presence of a voltage associated with the positive surface is necessary to change the position of the switch and pass that voltage to the output of the switch. Thus, the output of switch 107 has applied thereon a voltage $V_x$ associated with a selected cube and a selected positive or negative surface normal to the X body axis. Similarly, the output of switch 108 has applied thereon a voltage $V_y$ associated with a selected cube and a selected positive or negative surface normal to the Y body axis.

The output of switch 107 corresponds to Equation 17; the output of switch 108 corresponds to Equation 18 and the output of switch 105 corresponds to Equation 19.

As described hereinabove, these voltages provide the three variables necessary to solve for the three spherical coordinates of the sun position vector. Equations 20, 21, and 22 represent the equations which must be solved by the analog computer being described in order to derive analog quantities commensurate with the three spherical coordinates.

In accordance with Equation 21, the voltage $V_y$ and $V_x$ may be used as inputs to a conventional tangent servo 111 to derive an output voltage commensurate with the azimuth angle $\theta$. FIG. 7 illustrates an electrical block diagram of such a servo which, in addition to providing an input commensurate with $\theta$, may generate an electrical output commensurate with the rate of change of $\theta$ and another output commensurate with the quantity $$(V_x^2 + V_y^2)^{1/2}$$

Similarly, the voltages commensurate with the quantity $(V_x^2 + V_y^2)^{1/2}$ and the voltage commensurate with the quantity $V_z$ (the output of switch 105) may be utilized as inputs to a conventioanl elevation tangent servo 112. For the purpose of deriving a voltage commensurate with the spherical coordinate $\phi$ in accordance with the aforementioned Equation 22, tangent servo 112 may be constructed in accordance with the electrical block diagram shown in FIG. 8. This conventional tangent servo may also provide outputs commensurate with the rate of change of the spherical coordinate elevation angle $\phi$ and another output commensurate with the quantity $$(V_x^2 + V_y^2 + V_z^2)^{1/2}$$

In order to derive a quantity voltage commensurate with the spherical coordinate R representing the range from the sun to the vehicle by solving Equation 20, the voltage commensurate with the quantity $$(V_x^2 + V_y^2 + V_z^2)^{1/2}$$

is applied to a conventional square root network 113. The voltage output of square root network 113 is commensurate with this quantity $(V_x^2 + V_y^2 + V_z^2)^{1/2}$. If by means now shown a voltage is derived commensurate with the square root of the illuminous intensity of the sun ($I^{1/2}$), which is a constant, that voltage along with the voltage output of square root network 113 may act as inputs to a conventional dividing servo 114 for solving Equation 20 and derive an analog quantity commensurate with the range R from the vehicle to the sun. FIG. 9 shows an electrical block diagram of a conventional dividing servo.

Referring to FIG. 7, there is illustrated an electrical block diagram of a tangent servo which was shown as block 111 in FIG. 6. The function of the tangent servo of FIG. 7 is to take voltage inputs commensurate with $V_x$ and $V_y$ and solve for the spherical coordinate $\theta$ in accordance with Equation 21. Accordingly, in FIG. 7, the voltage commensurate with $V_x$ is applied to the two windings of a sine resolver 117 directly and also through a conventional inverter 116. Sine resolver 117 may be of conventional construction. The rotor of sine resolver 117 is positioned in accordance with output shaft 122 which is positioned commensurate with $\theta$. The voltage output from sine resolver 117 is equal to $V_x$ sine $\theta$ and is applied as one input to a conventional summing amplifier 119.

The voltage commensurate with $V_y$ is applied to two windings of a cosine resolver 118 directly and also through a conventional inverter 120. Cosine resolver 118 may be of conventional construction. As in the case of the sine resolver 117, the rotor of cosine resolver 118 is positioned by shaft 122 in accordance with the spherical coordinate $\theta$. The voltage output from cosine resolver 118 is commensurate with $V_y$ cosine $\theta$ and is applied as the other input to a conventional open loop (high gain) summing amplifier 119. Summing amplifier 119 operates to sum these two voltage components and energize motor 121 so as to rotate output shaft 122 in an appropriate direction. The rotors of resolvers 117 and 118 are driven by shaft 122 until the summation of the two input voltages to amplifiers 119 is equal to zero. Equation 23 sets forth this expression $$V_x \sin\theta + V_y \cos\theta = 0 \qquad (23)$$

Those skilled in the art will recognize that this expression can be mathematically rearranged as follows:

$$\text{Tangent } \theta = \frac{V_y}{V_x} \qquad (24)$$

Accordingly, when motor 121 drives the rotors of resolvers 117 and 118 to an angular position such that the summation of the inputs are made equal to zero, motor 121 is no longer energized and the angular position of shaft 122 is commensurate with the spherical coordinate $\theta$. The mechanization of Equation 24 solves Equation 21. If it is desired to obtain a quantity commensurate with the rate of change of $\theta$, a tachometer 123 may be connected to motor 121 for the purpose of generating a voltage commensurate with the rate at which shaft 122 is driven. Since it is desired to also compute a quantity commensurate with $(V_x^2 + V_y^2)^{1/2}$, shaft 122 may also be utilized to drive a second cosine resolver which has been energized directly and indirectly through an inverter 125 by a voltage commensurate with $$(V_x^2 + V_y^2)^{1/2}$$

The output of resolver 124 is thus equal to cosine $\theta$ and may be applied to an input of summing amplifier 120 along with another voltage input commensurate with $V_x$ so as to energize motor 126. Motor 126 will be energized appropriately so as to move the wiper of centertap potentiometer 128 and derive a voltage which in turn drives the output of amplifier 120 to zero. The voltage on the wiper of potentiometer 128 is equal to that quantity $(V_x^2 + V_y^2)^{1/2}$. The output of summing amplifier 120 is solving Equation 25.

$$(V_x^2 + V_y^2)^{1/2} \cos\theta + V_x = 0 \qquad (25)$$

The spherical coordinate $\theta$ and the rate of change that spherical coordinate $\theta$ may be used as inputs to a vehicle attitude control system 129 as desired in accordance with the particular practical application of the teachings of the present invention. The wiper of potentiometer 150 is shown connected to be positioned by shaft 122 so as to produce a voltage commensurate with $\theta$.

FIG. 8 shows an electrical block diagram very similar to the azimuth tangent servo of FIG. 7 except that its purpose is to derive quantities commensurate with the spherical coordinate $\phi$, the rate of change that spherical coordinate $\phi$ and still another quantity commensurate with $(V_x^2 + V_y^2 + V_z^2)^{1/2}$.

The function of the tangent servo of FIG. 8 is to take voltage inputs commensurate with $(V_x^2 + V_z^2)^{1/2}$ and $V_x$ and solve for the spherical coordinate $\phi$ in accordance with Equation 22. The voltage commensurate with this quantity $(V_x^2 + V_z^2)^{1/2}$ is applied to the two windings of a sine resolver 130 directly and also through an inverter 131. The rotor of conventional sine resolver 130 is positioned by a shaft 131 in accordance with the spherical coordinate $\phi$ being derived. The voltage output from the sine resolver 130 is equal to sine $(V_x^2 + V_z^2)^{1/2}$ sine $\phi$ and is applied as one input to conventional summing amplifier 132.

The voltage commensurate with $V_z$ is applied to the two windings of cosine resolver 130 directly and also through an inverter 134. As in the case of sine resolver 130, the rotor of cosine resolver 133 is positioned in accordance with the spherical coordinate $\phi$. The voltage output from cosine resolver 133 is commensurate with $V_z$ cosine $\phi$ and is applied to the other input of the conventional summing amplifier 132. Summing amplifier 132 operates to sum these two voltage components and energize the motor 135 so as to rotate output shaft 131 in an appropriate direction. The rotors of resolvers 130 and 133 are driven by shaft 131 until the summation of the two input voltages to amplifier 132 is equal to zero. Equation 26 set forth below sets forth a mathematical expression of the inputs of the summing amplifier 132:

$$(V_x^2+V_y^2)^{1/2} \text{ sine } \phi + V_z \text{ cosine } \phi = 0 \qquad (26)$$

Those skilled in the art will recognize that this expression can be mathematically rearranged as follows:

$$\text{Tangent } \phi = V_z(V_x^2+V_y^2)^{-1/2} \qquad (27)$$

Accordingly, when the motor 135 drives the rotors of resolvers 130 and 133 to an angular position such that the summation of the inputs are made to equal zero, motor 135 is no longer energized and the angular position of shaft 131 is commensurate with the spherical coordinate $\phi$. If it is desired to obtain a quantity commensurate with the rate of change of $\phi$, a tachometer 136 may be connected to motor 135 for the purpose of generating a voltage commensurate with the rate at which shaft 131 is being driven. Because it may be desired to convert the shaft position $\phi$ into a voltage, the wiper of potentiometer 151 is connected to be positioned by shaft 131.

Since it is desired to also compute a quantity commensurate with $(V_x^2+V_y^2+V_z^2)^{1/2}$, shaft 131 may also be used to drive a second cosine resolver 137 having two windings, where one is energized directly and the other through an inverter 138.

The voltage output of resolver 137 is equal to $$(V_x^2+V_y^2+V_z^2)^{1/2}$$

cosine $\phi$ and may be applied as an input to summing amplifier 139 in parallel with another voltage $V_z$ so as to energize motor 140. When motor 140 will be energized appropriately so as to move the wiper of center-tap potentiometer 141 and derive a voltage commensurate with $(V_x^2+V_y^2+V_z^2)^{1/2}$, the output of summing amplifier 139 is driven to be equal to zero. This condition may be represented mathematically by the following Equation 28:

$$(V_x^2+V_y^2+V_z^2)^{1/2} \text{ cosine } \phi + V_z = 0 \qquad (28)$$

The spherical coordinate $\phi$ and the rate of change of that spherical coordinate $\phi$ may be used as inputs to a vehicle attitude control system 129 as desired in accordance with particular practical applications of the teachings of the present invention. The exemplary analog computer system thus far described can derive the spherical coordinates of the light source in accordance with Equations 21 and 22. FIG. 9 shows a dividing servo usable to derive spherical coordinate R in accordance with Equation 19. Assuming an input voltage from the wiper of potentiometer 141 of FIG. 8, a conventional square root network 142 (shown in FIG. 9) may be used to derive the quantity $(V_x^2+V_y^2+V_z^2)^{1/4}$. This output of square root network 142 is applied to energize potentiometer 143 having a wiper which is positioned by shaft 144 in accordance with the energization of motor 145. The voltage on the wiper of potentiometer 143 is summed with a voltage commensurate with the luminous intensity of the sun ($I^{1/2}$) in summing amplifier 146. When the output of amplifier 146 is driven to zero, the following equation is solved:

$$I^{1/2} + (V_x^2+V_y^2+V_z^2)^{1/4} = 0 \qquad (29)$$

Shaft 144 is positioned in accordance with the Equation 20 hereinabove. Since it may be desired to have a voltage commensurate with R, shaft 144 is used to drive a wiper of potentiometer 146. The teachings of the present invention provide for the calculation of R (range to light source from vehicle) which is approximate. Other techniques are available if the range to the light source is required with a high degree of accuracy.

Thus, all three of the spherical coordinates, $\theta$, $\phi$ and R, of a light source with respect to the axis system of a vehicle may be derived by using the teachings of the present invention. Because analog servos solving for the tangent of angles have an inherent problem when the angles approach 90°, care must be exercised in the above-described analog computer embodiment to assure that some of the quantities generated do not exceed the limits of the analog circuitry. One approach might be to place additional constraints on the environment on the teachings of the present invention. For example, angles for $\phi$ and $\theta$ approaching 90° could be avoided. Alternatively, the spherical quantities $\theta$ and $\phi$ could be utilized as inputs to the vehicle attitude control system to modify the magnitude of these quantities and and maintain them within the safe operating limits.

While an analog computer has been shown utilizing the output voltages of the sensors constructed in accordance with the teachings of the present invention, it should be clear that a digital computer might also be used whenever that approach be more amendable to the practical approach. If a digital computer were used, each of the voltages generated by the sensor would have to be quantized in accordance with well-known digital techniques. The selection of the photosensitive surfaces and corresponding voltages would follow substantially the same technique. The conventional general purpose digital computer approach would be used to solve the Equations 20, 21 and 22 to derive the spherical coordinate of the light source. It should be noted that in the digital case there is no need for restricting the operating range to less than 90°.

A space vehicle utilizing the teachings of the present invention may thus obtain an indication of the variation of the line of sight of the sun from the body axis of the vehicle as represented by the spherical coordinates $\theta$ and $\phi$. By utilizing these two quantities as inputs to a vehicle attitude control system, the line of sight to the source may be made to coincide with any of the body axes of the craft. Thereupon, as shown in FIG. 10, a celestial navigation table may be utilized to determine the location of another celestial body which may be used as a navigational reference point. A conical search scan may then be initiated with an angle $\nabla$ based on the information obtained from the celestial navigation table. Since the position information known to the time of ejection of the vehicle into its space flight may be in error by an amount known as the volume of uncertainty, the thickness of a scan may be selected to correspond to the uncertainty of the known position of the vehicle.

Although the sensor configuration shown herein was a cube mounted on the vehicle at each extremity of the Z axis, there are many other sensor configurations which may be used. It does appear, however, there are many advantages to making the sensor surfaces flat, since they are easy to manufacture and relatively easy to install. While two cubes were shown in FIGS. 1 and 2, it might well be that in a particular practical application that the vehicle will be constructed somewhat in the shape of a cube with six flat surfaces provided for complete surveillance of the celestial sphere of the vehicle. In some instances it may be possible to have the vehicle remain non-cubicle in shape yet maintain six flat unobstructed surfaces at right angles to one another surveying the complete celestial sphere of the vehicle. Each of these flat surfaces will comprise photosensitive detection circuits.

Still another way of mounting the six sensor faces is to form the senser face of two orthogonal tetrahedrons (using three perpendicular sensor faces) in such a manner that each of the three parallel pairs of the sensor faces are mutually perpendicular. It is important that the two tetrahedrons be mounted on extension arms from the vehicle which are sufficient length that the six planes of the sensor faces are unobstructed. For example, these extension arms are required in order to insure that each of the six sensor surfaces will be in full view of the light source by having an unobstructed 180° field of view. The proper orientation of tetrahedrons would be maintained if their orientation to one another were that which they would have if they were cut from the cube.

It should be noted that the same technique can be used for selecting the required three sensor surfaces in the two six-face configurations described hereinabove as was used in the previously ten-surface configuration.

Even though the sensor configurations discussed hereinabove have utilized sensor surfaces which are parallel to three mutually perpendicular planes, it is also within the teachings of the present invention to design sensor configurations which have more than the basic six surfaces described and in which the surfaces are not parallel to at least one of the three mutually perpendicular planes. Such configurations are characterized by the fact that the sensor has overlapping fields of view and thus does not represent a minimum instrumention arrangement. However, certain design requirements may make it expedient not to use a sensor configuration having six surfaces parallel to three mutually perpendicular planes. For example, a sensor might comprise two hemispherical portions each of which has the photosensitive surfaces divided into plural sectors. Each hemispherical portion will of course be external to the vehicle on the extremities of the body axis. It is also possible to use conical, cylindrical or other curved surfaces which can be defined analytically. Since all of the non-flat surfaces increase the complexity of the resultant operating equations as well as the manufacturing problems, their use would probably be based on a specific condition precluding the use of flat surfaces.

Hereinabove, FIG. 4 described one type of photosensitive detection circuit which included means for compensating for the inherent non-linearities. One method for avoiding inherent non-linearities of a photosensitive detection circuit is to utilize a bridge-type circuit wherein the non-linearities of a dark and illuminated cell may be used to cancel undesired variations. As those skilled in the art will recognize, the analog computer circuit described hereinabove has, of course, not shown many of the circuit refinements necessary in an actual working computer. For example, electronic switches could be substituted for the relays shown and many amplifier and calibration components have been left out for purposes of clarity.

Hereinabove, the teachings of the present invention have been described as useful in determining the spherical coordinate ($\theta$, $\phi$ and R) of the body or instrumentation axes of the vehicle. This information can be used to change the attitude of the vehicle such that the line of sight from the vehicle to the light source can be made to coincide with any desired vehicular axis. Since the nominal orientation of the vehicle relative to the light source can usually be determined during the design phase of a vehicular system, it is possible to orient one of the sensor cubes to coincide with the nominal line-of-sight. It is, therefore, possible to use the aforementioned sensor system to approximately orient the vehicle and sensor in the desired direction relative to the light source and then use only the four sensor surfaces which are parallel to this nominal line-of-sight (the four side surfaces). The four side surfaces can now be used as either "on-off" sensors to drive a contactor type servo or as linear sensors to drive linear servo. The latter is possible since the change in sensor output is an appropriate linear variation with a displacement angle for small angular deviations about the nominal axis. It should be noted that in this "vernier" control type of operation, the aforementioned computation would not have to be performed and the sensor outputs could be fed directly into the attitude control system.

Even though the accuracy of this type of sensor might not be as good as other currently available techniques, it would be sufficient to achieve the initial orientation. Having then established the approximate orientation of the vehicle, the sensor accuracy would be greatly enhanced by using the sensor in this "null" mode of operation. In this mode of operation, any non-linearities or equipment drift would tend to be self-compensating without having to depend upon compensation circuits, and by using the approximate straight line variation of the sensor outputs even the aforementioned computations could be eliminated. Furthermore, since the vehicle attitude perturbations in this mode of operation are assumed to be very small, it is possible to use a much higher attitude loop gain without saturating the servo amplifiers and thus obtain an appreciable improvement in system accuracy.

In addition to the potential errors arising from sensor non-linearities, temperature variations, and similar instrumentation considerations, it is also important that the sensor be installed and operated so as to minimize the reflected or scattered illumination which strikes the sensor surfaces. The scattered light can originate from either atmospheric scattering or background illumination, as well as from roughness in surface finish of the adjacent vehicular structure. In the case of space operation, the atmospheric scattering is no problem and at lower altitudes the effect of this atmospheric scattering can be greatly reduced by reducing the field-of-view or coverage of the sensor. This reduction in field-of-view would be very effective especially when the sensor is operating in the aforementioned "null" mode of operation.

With respect to reflections from vehicular surfaces or protrusions, it is very important that the sensors be located so as to minimize these reflections. In the case of the two-cubed embodiment described herein, this reflection problem can be overcome by either painting all of the important areas of the vehicle with a very low reflective material, such as lamp black, or by mounting the sensor on the support or fixture such that reflected light cannot strike the sensor surface, even if the latter surface were highly reflective. An illustration of the latter approach would be to employ a truncated conical mounting plate (having a trapezoidal cross-section), the sides of which form an angle of 135° with the sides of the cubic sensor.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An electromagnetic energy sensing system adapted to derive electrical quantities commensurate with the spherical coordinates of an electromagnetic energy source with respect to a sensor comprising: a sensor including a cube having plural unobscured surfaces, each of said unobscured surfaces of said cube being coated with an electromagnetic energy sensing material for generating a voltage in accordance with the amount of electromagnetic energy striking that surface; computer means responsive to voltage inputs generated by the electromagnetic energy sensitive material coating on some of said surfaces for selecting some of said voltage inputs for computing the spherical coordinates of the source with respect to said sensor.

2. Electromagnetic energy sensing means comprising: a sensor having plural unobscured surfaces, each unobscured surface of said sensor having associated therewith an electromagnetic energy sensitive material for generating a distinct voltage in accordance with the amount of eletcromagnetic energy striking that surface, said sensor being adapted to cooperate with an electromagnetic energy source for deriving an electrical quantity commensurate with a spherical coordinate of the source with respect to said sensor.

3. An attitude and position sensing system adapted to derive quantities commensurate with the attitude and position of a vehicle with respect to a light source comprising: a vehicle having an X body axis, a Y body axis, and a Z body axis representing orthogonal angular degrees of freedom; a sensor mounted to have plural surfaces external to said vehicle for receiving light rays from a light source; said surfaces each receiving a different amount of light from said source determined by the angle of incidence of the line of sight between said light source and said sensor surface; each of said surfaces having a light sensitive material coated thereon for generating a voltage commensurate with the amount of light striking that surface; computer means responsive to voltage inputs generated by the light sensitive material coating on some of said surfaces for deriving electrical quantities commensurate with the range to said light source and the angular deviation of the line of sight to the light source from the vehicle body axes.

4. The combination set forth in claim 3 wherein said sensor comprises: cube means having flat surfaces coated with a light sensitive material.

5. Electro-magnetic energy sensor means comprising: a cube having at least five unobscured surfaces; each surface of said cube having associated therewith a light sensitive material for generating a distinct voltage in accordance with the amount of light striking that surface; said sensor being adapted to cooperate with a light source to derive electrical quantities commensurate with the attitude and position of the source with respect to said sensor.

6. Electro-magnetic energy sensor means comprising: a cube having at least five unobscured surfaces adapted to cooperate with a light source; each surface of said cube being coated with a light sensitive material for generating a distinct voltage in accordance with the amount of light striking that surface.

7. An attitude and position sensing system comprising: a vehicle whose attitude and position with respect to a light source is to be established; said vehicle having an X body axis, a Y body axis, and a Z body axis representing orthogonal angular degrees of freedom, a sensor comprising one cube placed external to said vehicle at one extremity of said Z axis and a second cube placed external to said vehicle at the other extremity of said Z axis; each of said cubes having five faces external to said vehicle; each of said five faces being coated with a light sensitive material for generating a voltage in accordance with the amount of light striking that face of the cube; computer means responsive to voltage inputs generated by the coating of ligh sensitive on some of the faces of said cubes for deriving electrical quantities commensurate with the range to a light source having rays which strike some of the faces of the cubes and the angular deviation of the line of sight to the light source from the vehicle body axis.

8. Electro-magnetic energy sensor means comprising: a cube having plural unobscured surfaces adapted to cooperate with an electro-magnetic energy source, each unobscured surface of said cube having an electro-magnetic sensitive material associated therewith for generating a distinct voltage in accordance with the amount of electromagnetic energy striking that surface.

9. An electromagnetic energy sensing system adapted to derive quantities commensurate with the spherical coordinates of an electromagnetic energy source with respect to a sensor comprising: a sensor including a cube having at least five unobscured surfaces, each of said unobscured surfaces of said cube being coated with an electromagnetic energy sensing material for generating a voltage in accordance with the amount of electromagnetic energy striking that surface, said sensor being adapted to cooperate with an electromagnetic energy source to derive electrical quantities commensurate with the spherical coordinates of the source with respect to said sensor.

References Cited in the file of this patent
UNITED STATES PATENTS

| | | |
|---|---|---|
| 2,928,950 | Myer | Mar. 15, 1960 |
| 2,958,135 | Lakin | Nov. 1, 1960 |
| 2,976,758 | Parker | Mar. 28, 1961 |
| 2,983,823 | Oberly | May 9, 1961 |
| 2,986,644 | Cheroff | May 30, 1961 |